United States Patent Office 3,595,908
Patented July 27, 1971

3,595,908
TWO-STEP OXIDATION OF PARAXYLENE FOR THE PRODUCTION OF TEREPHTHALIC ACID
Daniel Lumbroso, Le Vesinet, Yvelines, France, assignor to Institut Francais du Petrole des Carburants et Lubrifiants, Rueil-Malmaison, France
No Drawing. Filed Nov. 1, 1966, Ser. No. 591,143
Int. Cl. C07c 63/02
U.S. Cl. 260—524R 8 Claims

ABSTRACT OF THE DISCLOSURE

For the production of terephthalic acid by the oxidation of paraxylene, an improvement is obtained by conducting a two-step continuous process, as follows:
(1) passing molecular oxygen into a reaction zone maintained at 80–125° C., said reaction zone containing a mixture of paraxylene and paratoluic acid in a proportion of 0.5–4% by weight paraxylene and 96–99.5% by weight paratoluic acid, the former and the latter being dissolved in an aliphatic carboxylic acid containing an oxidation catalyst, paraxylene being fed continuously to the reaction zone to maintain the above ratio of paraxylene to paratoluic acid and
(2) withdrawing resultant reaction mixture continuously from the first reaction zone, and passing same to a second reaction zone separate and distinct from said first reaction zone, and subjecting said reaction mixture to additional oxidation with molecular oxygen at 130–170° C., recovering terephthalic acid and paratoluic acid from said second reaction zone, and recycling at least a part of said recovered paratoluic acid to said first reaction zone.

---

Applicant hereby claims the benefit of the filing date of French Patent application P.V. No. 3,872, filed Nov. 9, 1965.

This invention relates to a process for production of terephthalic acid by a novel two-stage oxidation process wherein paraxylene is the starting material.

It has laready been suggested to oxidize paraxylene in the liquid phase in a solution of an aliphatic carboxylic acid, such as, for example, acetic acid and homologs thereof. The reaction is then conducted by introducing molecular oxygen at about 80–200° C. in catalytic contact with a heavy metal catalyst. Paraxylene is first converted into paratoluic acid which is then, in turn, transformed, upon further oxidation, to terephthalic acid. A process of this type is described, for example, in United States Pat. 2,245,528.

Even with improvements in the catalysts which have been employed in the above conventional process, the yields of terephthalic acid are not entirely satisfactory. On the other hand, taking into account the competition in this area, and the fact that this type of process has proven to be a valuable process, any further improvements are of substantial interest and are economically important.

As a modification of the above-described process, there is disclosed in French Pat. No. 1,017,881 of Apr. 5, 1950, an oxidation procedure based on a mixture containing 5–50 parts paraxylene and 15–95 parts paratoluic acid in an inert solvent selected from the group consisting of ortho-dichlorobenzene, chlorobenzene, tert.-butyl benzene, diphenyl, benzoic acid, and 1,2,3-trichloropropane. According to this patent, if the same mixture of paraxylene and paratoluic acid is oxidized in an acetic acid solution, there is no significant yield of terephthalic acid. The same negative result is obtained if paratoluic acid by itself is dissolved in acetic acid, in the absence of paraxylene.

This process described in the French patent is pertinent to the present invention, as it emphasizes the non-obviousness of the particular procedure described herein.

An object of the present invention, therefore, is to provide an improved process for the production of terephthalic acid from paraxylene, and in particular, a process which results in a higher yield of the terephthalic acid.

Upon further study of the specification and claims, other objects and advantages of the present invention will become apparent.

For the attainment of the above objects, an improved process is provided wherein a mixture of xylene and paratoluic acid, dissolved in acetic acid or in a functionally equivalent aliphatic carboxylic acid, is subjected to a novel reaction scheme, which not only results in a substantial production of terephthalic acid, but also in such high yields that the process is an improvement over the prior art as a whole. This is a particularly unexpected development, inasmuch as the previously cited French patent indicated that no substantial yield of terephthalic acid is obtained when a mixture of paraxylene and toluic acid in acetic acid is treated under the reaction conditions set forth therein.

The process of this invention comprises the following two basic steps:
(1) Passing molecular oxygen into a mixture of paraxylene and paratoluic acid containing 0.5–4% by weight, preferably 1–3% by weight paraxylene, and 96–99.5%, preferably 97–99% by weight paratoluic acid. The latter mixture is dissolved in an aliphatic carboxylic acid which contains a heavy metal catalyst. Paraxylene is continuously or periodically added to the reaction zone to maintain the above ratio between paraxylene and paratoluic acid.
(2) Withdrawing from the first reaction zone the reaction mixture which is then passed to a second reaction zone separate and distinct from said first reaction zone, wherein the reaction mixture is subjected to a supplemental oxidation with molecular oxygen, and wherein terephtalic acid is precipitated.

After the precipitation step, the terephtalic acid is then filtered by any conventional method.

In the first reaction zone, it is important to provide a continuous feed of the carboxylic acid and the oxidation catalyst so that an excessive depletion in these components can be avoided in the reaction mixture. It is preferred, in this connection, that the carboxylic acid solvent and the oxidation catalyst be fed at a rate just sufficient to maintain a constant concentration.

As the aliphatic carboxylic acid, it is preferred to use a lower alkanoic acid, for example, containing 2–8 carbon atoms, and more preferably acetic acid. The proportion of this aliphatic carboxylic acid can be varied largely, for Example 10–1,000 parts by weight per part by weight of the xylene present in the first reaction zone. It is to be understood, however, that this ratio of 10–1,000 can itself be varied.

As the oxidation catalyst, there can be employed a compound of a transition metal, preferably a salt of cobalt or manganese, or a mixture of several of these compounds. Such catalysts have been described specifically in the literature, and are not an inventive contribution of the present process. In this connection, reference is directed in particular to U.S. Pat. 2,245,528 cited above and U.S. Pat. 2,276,774.

The oxidation catalysts, like the acetic acid solvent, can be employed in widely varying proportions, for example, 0.1–50 parts by weight of the catalyst per part by weight of paraxylene present in the first reaction zone.

Aside from the main catalyst, various accelerators, and other catalyst additives can be employed, for example, olefins, ethers, ketones, aldehydes, peroxides, and analogs thereof. Again, these catalyst additives have already been described in the literature, and can be employed in the same proportions as in the past. Reference, in this connection, is directed to the same refeernces set forth for the oxidation catalysts, as well as French Pat. No. 1,196,668.

The molecular oxygen which is the oxidizing agent in this invention can be employed in any concentration, for example, in the form of air, or in the form of pure oxygen. It is conceivable, but highly unlikely, that other oxidation agents can be economically employed as a substitute for air. Since this invention is not directed to any inventive contribution with respect to the oxidation agent, the claims are to be interpreted as covering any and all oxidation agents.

With respect to the reaction conditions that are used in this invention, in the first step, a temperature of 80–125° C., preferably 90–115° C. is employed. In the second step, there is employed a temperature of 130–200° C., preferably 140–160° C.

The reaction pressures are generally superatmospheric, preferably being about 2–30 kg./cm.$^2$.

Paraxylene is injected in the first reaction step at the rate of 0.1 to 5 kg. per kg. of mixture of xylene and paratoluic acid per hour. The above given injection rates are not critical and do not represent the essential feature of the invention. On the other hand, maintaining in the first step the concentration in p-xylene between the limits hereabove specified, provides the high yields characteristic of this invention.

The equipment that can be employed to carry out the reactions of the first and second steps is of classical type, for example a vessel equipped with an agitating device.

The terephthalic acid, precipitated in the solid state in the second reaction zone can be separated by any conventional manner, such as filtration, centrifugation, etc. The resultant mother liquor from the second reaction step can be recycled either to the first, or to the second reaction zone, as such, or after fractionation.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Into a first reactor, there are introduced at the outset, at a temperature of 110° C., the following components:

0.2 kg. paraxylene
9.8 kg. paratoluic acid
50 liters acetic acid
0.8 kg. cobalt acetate
0.55 kg. barium bromide
2 kg. methylethyl ketone
0.05 kg. acetaldehyde Air is then passed into this mixture at a rate of 7.1 m.$^3$/h. and paraxylene is also introduced at a rate of about 0.5 kg. per kg. of mixture of xylene and paratoluic acid per hour.

The liquid phase is withdrawn at a rate corresponding to about 6.3 kg./h. toluic acid. The volume of liquid in the reactor is completed by recycling the liquid phase from the second reactor, after separation of terephthalic acid. Make up quantities of xylene, paratoluic acid, solvent (acetic acid) and catalyst component are added in order to maintain the initial composition.

The withdrawn liquid phase is passed to a second reactor maintained at a temperature of about 150° C., containing the same catalytic components present in the first reactor. Air is passed through this second reactor in a stoichiometric excess for the production of terephthalic acid.

With respect to the relative concentrations of xylene, paratoluic acid, and terephthalic acid in the second reactor, such concentrations are necessarily different than found in the first reactor. In particular, it is to be noted that the percentage of paraxylene in the second reactor is practically zero, that is to say, lower than 0.5% by weight. With respect to the terephthalic acid concentration in the second reactor, it is not present in the liquid phase, for all practical purposes, inasmuch as it is precipitated at a rate proportional to its formation.

The effluent from the second reactor is filtered, thereby obtaining terephthalic acid at a molar yield of 97%. The filtrate is then recycled to the first reactor.

EXAMPLE 2

Example 1 is repeated, except that in the first oxidation step (the first reactor), the catalyst is changed by the removal of acetaldehyde. All other conditions being equal, there is thus obtained after filtration of the withdrawn liquid from the second reactor terephthalic acid at a molar yield of 95%.

EXAMPLE 3

Example 1 is repeated, but the following components are initially introduced into the first reactor instead of the components set forth in Example 1:

0.2 kg. paraxylene
9.8 kg. paratoluic acid
50 liters acetic acid
0.7 kg. cobalt bromide hexahydrate (CoBr$_2$·6H$_2$O)
2 kg. methylethyl ketone
0.05 kg. acetaldehyde Using the same reaction conditions present in Example 1, note particularly the feeding of fresh xylene and withdrawal of liquid from the first reaction zone, terephthalic acid is obtained in a molar yield of 96%.

EXAMPLE 4

Example 1 is repeated, except that the proportion of xylene to paratoluic acid is changed to:

0.4 kg. xylene and
9.8 kg. paratoluic acid in the first reactor. The other components and reaction conditions are unchanged. The resultant molar yield of terephthalic acid is 97%.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A two-step continuous process for the production of terephthalic acid by the oxidation of paraxylene, which process comprises:
    (1) passing molecular oxygen into a reaction zone maintained at 80–125° C., said reaction zone containing a mixture of paraxylene and paratoluic acid in a proportion of 0.5–4% by weight paraxylene and 96–99.5% by weight paratoluic acid, the former and the latter being dissolved in an aliphatic carboxylic acid containing an oxidation catalyst, paraxylene being fed continuously to the reaction zone to maintain the above ratio of paraxylene to paratoluic acid and

(2) withdrawing resultant reaction mixture continuously from the first reaction zone, and passing same to a second reaction zone separate and distinct from said first reaction zone, and subjecting said reaction mixture to additional oxidation with molecular oxygen at 130–170° C., recovering terephthalic acid and paratoluic acid from said second reaction zone, and recycling at least a part of said recovered paratoluic acid to said first reaction zone.

2. A process as defined by claim 1 wherein the reaction temperature in step (1) is 90–115° C., and the reaction temperature in the second step is 140–160° C.

3. A process as defined by claim 1 wherein the paraxylene content in the first reaction zone is 1–3% by weight.

4. A process as defined by claim 1 wherein the carboxylic acid and oxidation catalyst are introduced to the reaction zone in order to maintain a substantially constant concentration of said components in said reaction zone.

5. A process as defined by claim 1 wherein the aliphatic carboxylic acid is acetic acid.

6. A process as defined by claim 1 wherein a quantity of 10–1,000 parts by weight of said aliphatic carboxylic acid is employed per part by weight of paraxylene in step (1).

7. A process as defined by claim 1 wherein 0.1–50 parts by weight of said oxidation catalyst is employed per part by weight of paraxylene present in step (1).

8. A process as defined by claim 1 wherein said oxidation catalyst is a mixture of cobalt acetate and barium bromide.

References Cited

UNITED STATES PATENTS

| | | | |
|---|---|---|---|
| 2,245,528 | 6/1941 | Loder | 260—524 |
| 2,894,978 | 7/1959 | Katzschmann | 260—524 |

FOREIGN PATENTS

| | | | |
|---|---|---|---|
| 1,317,707 | 1/1963 | France | 260—524 |
| 1,017,881 | 12/1952 | France | 260—524 |

LEWIS GOTTS, Primary Examiner

R. S. WEISSBERG, Assistant Examiner

UNITED STATES PATENT OFFICE
CERTIFICATE OF CORRECTION

Patent No. 3,595,908            Dated July 27, 1971

Inventor(s) Daniel Lumbroso et al

It is certified that error appears in the above-identified patent and that said Letters Patent are hereby corrected as shown below:

In the Specification:

Col. 1, line 2, please change "3,872" to ---37,872---.

Signed and sealed this 6th day of June 1972.

(SEAL)
Attest:

EDWARD M. FLETCHER, JR.          ROBERT GOTTSCHALK
Attesting Officer                 Commissioner of Patents